United States Patent [19]

Kurumada et al.

[11] Patent Number: 4,800,042

[45] Date of Patent: Jan. 24, 1989

[54] RADIOACTIVE WASTE WATER TREATMENT

[75] Inventors: Norimitsu Kurumada; Hiroshi Kuribayashi, both of Ibaraki; Setsuo Shibata, Yokohama; Toshikatsu Wakabayashi, Miyagi; Akira Hasegawa, Ibaraki; Mamoru Shibuya, Aichi, all of Japan

[73] Assignee: JGC Corporation, Tokyo, Japan

[21] Appl. No.: 8,082

[22] Filed: Jan. 27, 1987

Related U.S. Application Data

[63] Continuation-in-part of Ser. No. 693,692, Jan. 22, 1985, abandoned.

[51] Int. Cl.$^4$ .......................... G21F 9/16; G21F 9/08; F26B 7/00; B01D 1/00
[52] U.S. Cl. .................................. 252/628; 159/47.3; 159/DIG. 12; 210/710; 210/712; 210/751; 252/631; 252/632; 423/158; 423/182; 423/183; 423/184; 423/277; 423/279
[58] Field of Search .............. 252/628, 629, 631, 632; 159/DIG. 12, 47.3; 106/78, 4, 89, 118, 97; 223/158, 279, 166, 280, 179, 281, 183, 277, 184, 199, 181, 182; 210/682–683, 684, 685, 687, 710, 712, 718, 743, 751

[56] References Cited

U.S. PATENT DOCUMENTS

| | | | |
|---|---|---|---|
| 3,890,244 | 6/1975 | Carlin | 423/2 |
| 4,086,325 | 4/1978 | Cordier et al. | 423/280 |
| 4,122,028 | 10/1978 | Iffland et al. | 423/279 |
| 4,253,985 | 3/1981 | Filter et al. | 252/628 |
| 4,379,081 | 4/1983 | Rootham et al. | 252/628 |
| 4,409,137 | 10/1983 | Mergan et al. | 252/632 |
| 4,671,897 | 6/1987 | Mori et al. | 252/628 |

FOREIGN PATENT DOCUMENTS

| | | | |
|---|---|---|---|
| 0158780 | 10/1985 | European Pat. Off. | 252/628 |
| 0171898 | 9/1984 | Japan | 252/628 |
| 0082895 | 5/1985 | Japan | 252/629 |

Primary Examiner—Howard J. Locker
Attorney, Agent, or Firm—Armstrong, Nikaido, Marmelstein & Kubovcik

[57] ABSTRACT

A volume-reducing solidification treatment method for radioactive waste liquid containing boron primarily in the form of boric acid or borates is disclosed.

After an alkali is added to the waste water to adjust pH thereof, and optionally after evaporation concentration is carried out, soluble calcium compounds such as Ca(OH)$_2$ are added, the waste water is stirred at a specific temperature to form insoluble calcium borate aged at a lower temperature than that of forming borate, and evaporation and concentration is carried out, which raises the concentration of the solid component. The concentrated liquid obtained is solidified with cement.

The concentrated liquid may also be dried into a powder using a thin film evaporator.

Liquid containing insoluble calcium borate obtained after solid-liquid separation may be recycled for use as a waste water pH adjusting agent, or, may be evaporated and concentrated, and the concentrated liquid may be solidified with cement along with the concentrated solid component obtained through solid-liquid separation.

15 Claims, 8 Drawing Sheets

RADIOACTIVE WASTE WATER TREATMENT

This application is a continuation-in-part of application Ser. No. 693,692 filed Jan. 22, 1985 (now abandoned).

BACKGROUND OF THE INVENTION

1. Field of the Invention

The present invention relates to an improved volume-reducing solidification treatment of radioactive waste water containing boron primarily as boric acid or borates.

2. State of the Art

At nuclear power facilities, especially PWR type plants generating radioactive waste water containing boron primarily as boric acid, or borates, where solidification with the cement has been conducted, the waste water is evaporated and concentrated and as much as possible of the solid component is mixed with a cement paste in order to meet requirements in recent years for as high a degree of volume reduction as possible.

However, the following two problems exist with volume-reducing cement solidification. Boron primarily as boric acid or borates is dissolved in the waste water, and:

(1) during the evaporation and concentration process the boric acid or borates crystallizes, causing problems during the concentration operation;

(2) when the concentration of boric acid ions in the cement increases, hydration reaction of the cement is hindered and a satisfactory solidified product can not be obtained.

Concerning the first problem, by adding caustic soda to the waste water the boric acid is converted to sodium salts thereof and solubility of the boron compound is raised. At the same time, this also serves as an acid neutralization treatment of the waste water. But, to avoid crystallization of sodium salts, there are limits to the degree of concentration attainable.

Measures to render the boric acid insoluble are possible in order to solve the second problem.

In the solidification treatment of radioactive waste water the prior art includes a cement solidification method (Japanese Patent Disclosure No. 54- 145900) which also uses asbestos fibers, in which dissolved matter is made insoluble, forming a stable suspension which is concentrated. This method discloses the use of lime or baryta to render the boric acid in the liquid insoluble.

However, in a method such as this, when, for example, lime is added to render the boric acid insoluble, minute fibrous matter preciipitates, the liquid becomes thixotropic or sensitive to vibration, and is extremely difficult to handle. The liquid will maintain a paste-like state when agitated and when agitation is stopped it will change into a gel.

SUMMARY OF THE INVENTION

The object of the present invention is to provide a method making possible a superior volume-reducing cement solidification treatment of radioactive waste water containing boron through the use of a simplified, intense evaporation and concentration which renders the waste water containing insoluble calcium salts easier to handle.

The first pattern of the treatment method according to the present invention is a volume-reducing solidification treatment of radioactive waste water containing boron, characterized by adjustment of the water to be alkaline or neutral, addition of a soluble calcium compound resulting in a Ca/B molar ratio of at least 0.2, stirring while keeping a 40°–70° C. temperature to form insoluble calcium salts containing boron, aging at a temperature lower than that used while stirring, evaporation and concentration yielding a concentrated liquid with a high solid component concentration, and the mixing of this concentrated liquid with cement.

In an alternative of the above first pattern a portion of the aged liquid containing the insoluble salts is recycled and added to the waste water.

The second pattern uses evaporation and concentration of the waste water immediately after the neutralization of acidity of the waste water with alkali. The supernatant from the solid-liquid separation step is used as the alkaline water.

The third pattern includes such an intensive evaporation and concentration step of the first pattern that the slurry is dried to a powder, which is then solidified with cement. Also in this pattern, the aged liquid containing the insoluble salts may be recycled and added to the waste water.

The fourth pattern is characterized by solid-liquid separation prior to the evaporation and concentration step of the first pattern and only the supernatant is subjected to the evaporation and concentration. The resulting concentrated liquid is solidified together with the concentrated liquid is solidified together with the concentrated solid component from the solid-liquid separation step by mixing with cement. In an alternative way, a portion of the waste water may be directly evaporated and concentrated with the above supernatant.

DETAILED EXPLANATION OF PREFERRED EMBODIMENTS

Figure 1:
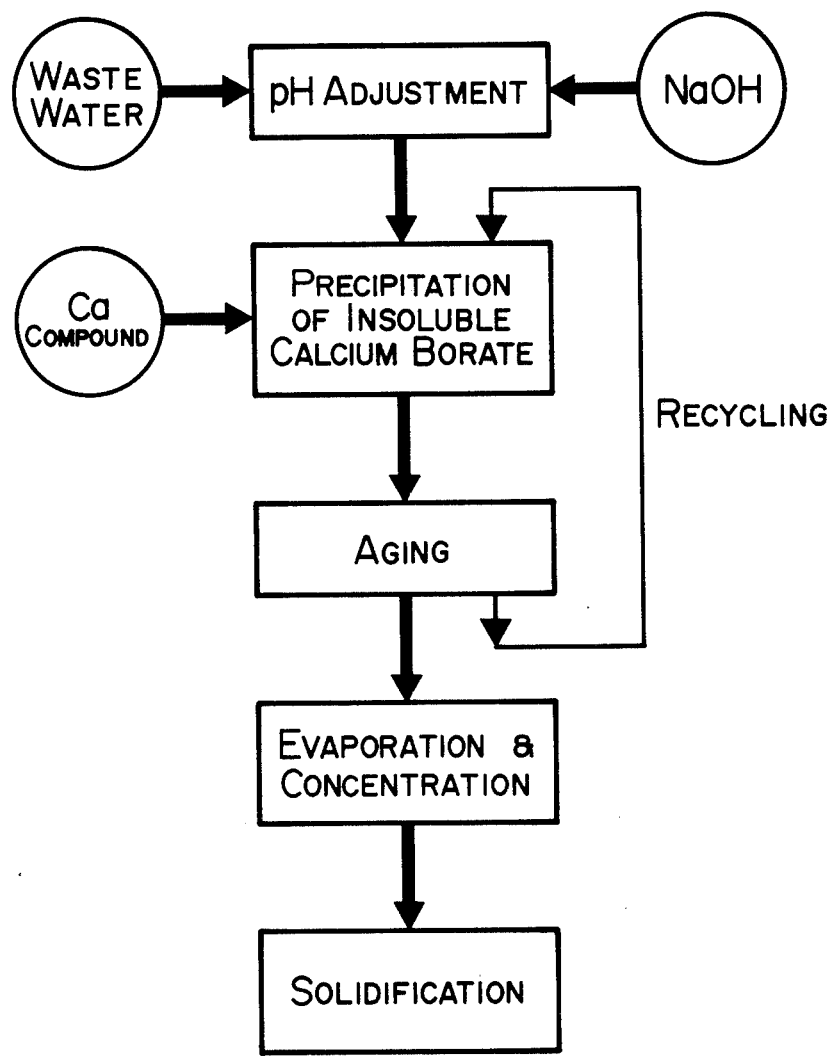
FIG. 1 is a block diagram showing the first pattern of the treatment method according to the present invention.

The first pattern of the present method will now be explained with reference to the drawings. As illustrated in FIG. 1, an alkaline substance is added to the radioactive waste water containing boron to raise the pH of the waste water to 7 or more. The pH adjustment is made for the purpose of conducting the precipitation reaction of the insoluble calcium salts at an alkaline pH, because the rate of formaton of these salts at an acidic pH is extremely slow and impractical. For this purpose a suitable amount of caustic soda may be added upon necessity. However, it is likely that the pH of waste water is adjusted to more than 7 at concentration step, and in this case the pH adjustment step can be omitted.

After the pH adjustment, the waste water receives a soluble calcium compound. The calcium compound causing precipitation of the insoluble salts may be any compound having sufficient solubility to react with boric acid ions and produce insoluble salts, such as calcium hydroxide, calcium oxide, calcium nitrate, or portland cement clinker. It is preferable to use an oxide or hydroxide compound in order to keep the increase of solids in the waste water as low as possible. Two or more of these calcium compounds can also be used jointely. The compounds can be added as a powder, slurry, or aqueous solution, but calcium oxide should be used with care to avoid sudden generation of heat when it comes into contact with water.

Figure 2:
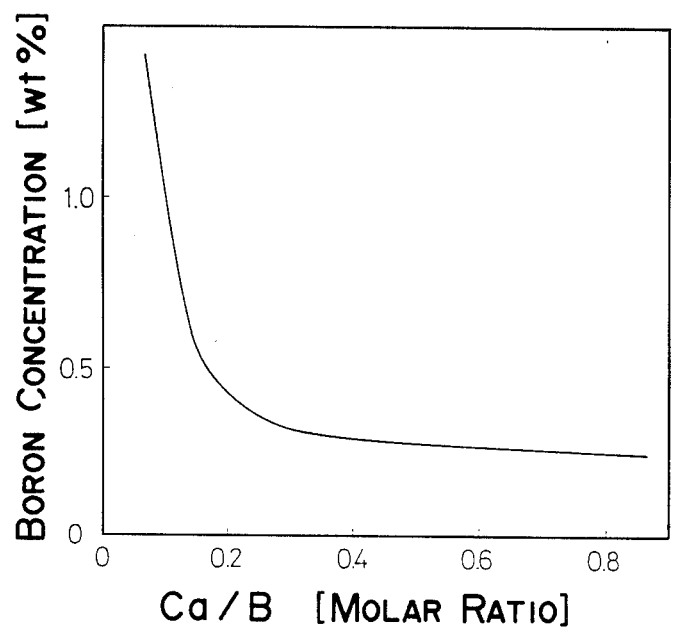
FIG. 2 is a graph showing the rate of decline of dissolved boron concentration as the ratio of calcium to boron (Ca/B molar ratio) added to the waste water is increased during the formation of insoluble salts.

The amount of calcium compound added to the waste water containing boron should result in a Ca/B molar ratio of at least 0.2. When calcium compound was added, at various Ca/B ratios, to waste water with a 2.1% by weight concentration of boron and a reaction temperature of 60° C., the results shown in FIG. 2 were obtained. When the aforementioned minimum 0.2 molar ratio is not exceeded, the boric acid is not sufficiently precipitated. At a high Ca/B ratio, insoluble salts form more rapidly. It is not necessary to establish a maximum, but, as shown in FIG. 2, saturation occurs at about the 0.6–0.7 ratio, a large amount of addition is not significant, and because it is preferable not to increase the solid component in the waste water, a Ca/B ratio from 0.5–0.7 is advisable.

The higher the temperature is, the quicker the reaction to form insoluble salts proceeds until the temperature reaches the high limit of 70° C., and 40° C. and above is practicle. At temperatures above 70° C. reactions were observed to become rather slow. This is thought to be due to the decreasing solubility of calcium ions. Also, if the temperature is high, paste formed as a result of the reaction will be hard, and a drawback in the operation. With normal equipment a 70° C. level is the permissible limit and preferably less than 60° C. Stirring is necessary when this step is carried out.

The major feature of the present invention is the employment of an aging step which follows the aforementioned reaction forming insoluble salts. At the beginning of the precipitation of the insoluble salts the liquid is in the form of a slurry, and as the precipitation proceeds to increase the amount of the insoluble substance, the liquid becomes pasty in appearance. The aging is implemented by cooling the thus obtained pasty substance and holding it for several hours. The temperature must be lower than the reaction temperature during precipitation of the insoluble salts. Through aging, the paste is changed into a slurry again, and the insoluble salts sediment, making separation of water easier. This change was confirmed through microscopic observation. The just-precipitated insoluble salts, before aging, have a fine, fibrous shape, but after aging grow into large, platy or prismatic-shaped crystals.

The slurry obtained through aging is, contrary to the pasty substance, easy to hancle, and evaporation and concentration are easily carried out.

Any apparatus capable of carrying out evaporation and concentration may be used. Also, the operation may be carried out by any method such as the continuous method or the batch method, but the semi-batch method with continuous feed of the slurry and batchwise discharge of the concentrated paste is satisfactory. Concentration can be controlled by the amount of condensate obtained by condesning the evaporated water.

The degree of concentration is determined based on the degree of volume reduction of wastes and the ease with which the concentrated paste is handled, the mixing properties during successive cement solidification steps and the properties of hardened products. In order to reduce the volume of hardened product to less than ½ of the volume of original waste water and in order to obtain a satisfactory hardened product, a solid component concentration of the paste obtained in the concentration step of 30–80% is suitable.

Cement solidifcation, namely the mixing of concentrated paste, cement, and, if necessary, supplemental water, and the pouring of mixed cement paste into a container can be carrie dout by known techniques. Portland cement, mixed portland cement, high aluminous cement, or any other inorganic hydraulic cement material can be used.

In a modification of the first pattern a portion of the liquid obtained through aging is recycled into the waste water, and, along with the addition of a calcium compound, precipitates insoluble salts.

As shown by the thin line in FIG. 1, the method of treating radioactive boron-containing waste water through volume reduction is characterized by pH adjustment of the waste water ot alkaline or neutral, addition of calcium compound resulting in a Ca/B molar ratio of at least 0.2, stirring at a temperature from 40°–70° C. to form insoluble calcium salts containing boron, aging at a temperature lower than that used for forming insoluble salts to obtain slurry reducing a portion of the aged liquid to the waste water, evaporating and concentrating the remaining aged liquid, and mixing the concentrated liquid with cement.

In this way, reaction time needed to precipitate insoluble salts is shortened by a large margin, to one-half of the time or less than when recycling is not carried out.

If the recycled liquid is strongly alkaline, it is not necessary to add caustic soda or the like for pH adjustment of the waste water, or at most to add a reduced amount, thus preventing an increase in the amount of waste matter present during solidification.

Not only does recycling a portion of the aged liquid promote insoluble salt precipitation due to a rise in initial pH of the waste water, but it also promotes crystallization due to a seeding effect by adding the grown crystals.

The amount to be recycled should be determined on the basis of the effect on the shortening necessary reaction time, which is more significant at a larger amount of recycling, and the capacity of the apparatus, which, on the other hand, will be large at a higher recylcing percentage. In general, it is advisable to use the recycling percentage higher than 10% at which the effect is appreciable, and lower than 30% at which the effect nearly saturates.

According to the method of the present invention throughout the above-described first pattern and the second to the fourth patterns mentioned below, the paste formed by addition of a calcium compound to a boroncontaining component is essentially insoluble and has no adverse effect on setting and hardening of cement, allowing a satisfactory hardened product to be obtained. The material used is inexpensive and easily available, and the apparatus may be of a conventional type. Thus, the present method can be readily practiced.

The second pattern of the present method was invented on the basis of our discovery that a substantial portion of the caustic soda added to the waste water for neutralization is finally released in the liquid phase.

The second pattern is characterized by neutralization of acid waste water through recycling in which caustic soda is added to acidic waste water for neutralization, followed by evaporation and concentration. A calcium compound is then added to precipitate insoluble calcium borate, the liquid is aged, causing growth of precipitate particles along with an increase in the pH to at least 12, solid and liquid portions are separated, the precipitated concentrated solid portion, as a slurry, is solidified with cement, while the separated supernatant with a pH of at least 12 is recycled to neutralize acidic waste water.

Figure 4:
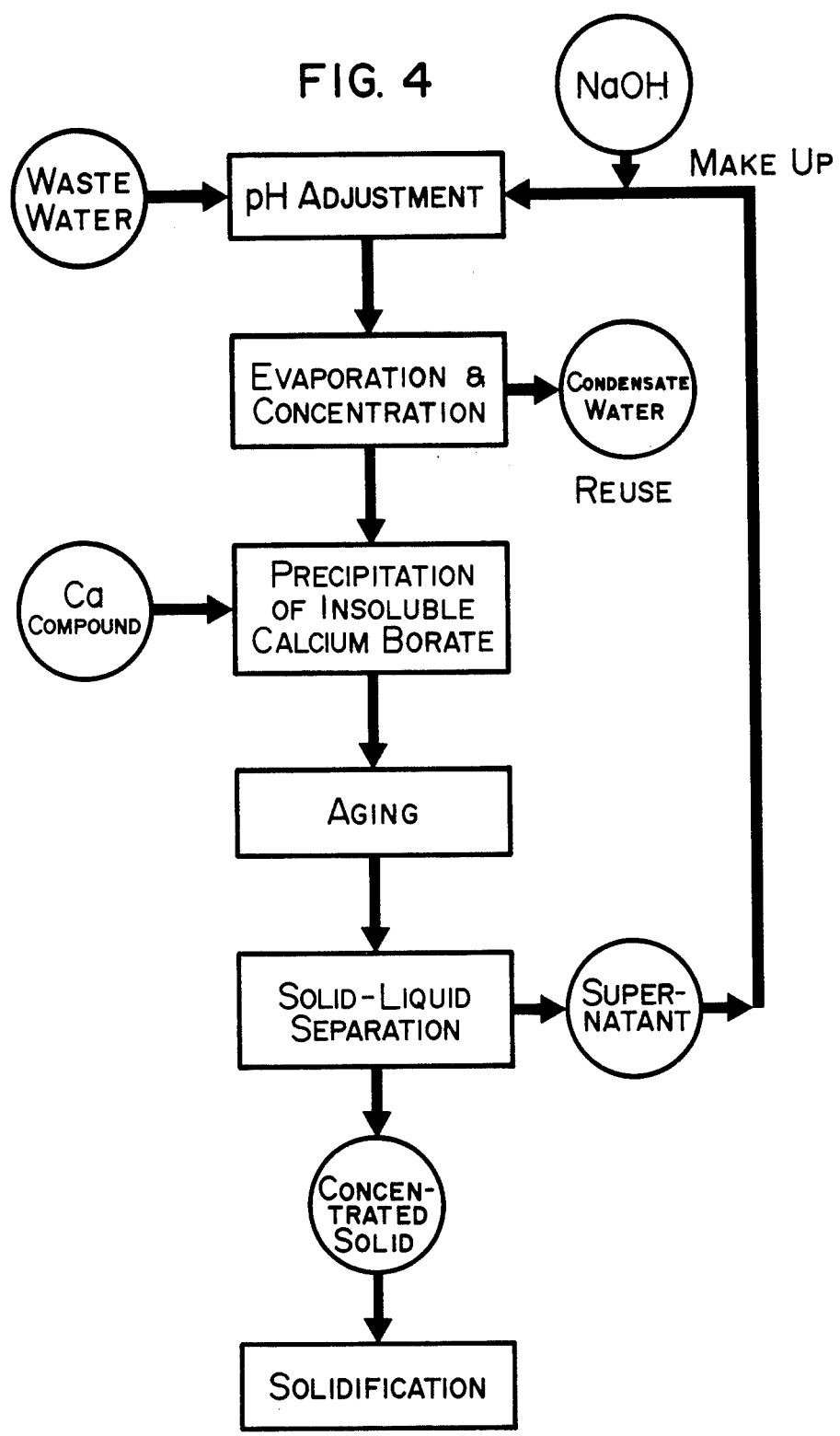
FIG. 4 is a block diagram showing the second pattern of the treatment method according to the present invention.

Referring to FIG. 4, a caustic soda aqueous solution is added to acidic radioactive waste water containing boric acid. The pH is adjusted and evaporation and concentration are carried out. boric acid content as boron of the waste water is approximately 2,100 ppm, and increases 10 times, to 21,000 ppm, after evaporation and concentration. The caustic soda can be added before or during evaporation and concentration, but, in any case, the pH of the liquid during concentration should be maintained at 7-8. This pH can be obtained when the Na/B molar ratio is 0.1-0.3, at a concentrated liquid boron content of 21,000 ppm.

It is possible to reuse the condensate from evaporation and concentration.

Next, a soluble calcium compound is added to the concentrated waste water, and aging follows precipitation of insoluble calcium borate. The aging step is carried out as in the first pattern. For the precipitation reaction fo insoluble salts, a high temperature hastens the reaction, and a temperature of 40° C. or higher is practical. If the temperature is too high teh paste obtained from the reaction will stiffen, a drawback operationally. A temperature at the 70° C. level is the allowable limit when a normal apparatus is used, with 60° C. being desirable.

Stirring is necessary for this step, using equipment with at least 2 blades; upper and lower sides, preferably, a type in which up and down motion is added along with rotation.

When precipitation of the insoluble salts begins, the liquid is in a slurry state, but changes into a paste as precipitation proceeds and the precipitate increases. When there is no further change, the liquid is cooled and aged.

During aging the reaction of sodium borate and calcium ion is complete, and along with a lowering of boron content there is a restoration of sodium content in liquid phase. Accompanying this is a rise in the pH of the liquid. There is also growth of precipitated calcium borate crystals, and because they are large platy or prismatic crystals, the liquid changes from a paste to a slurry again.

Figure 5:
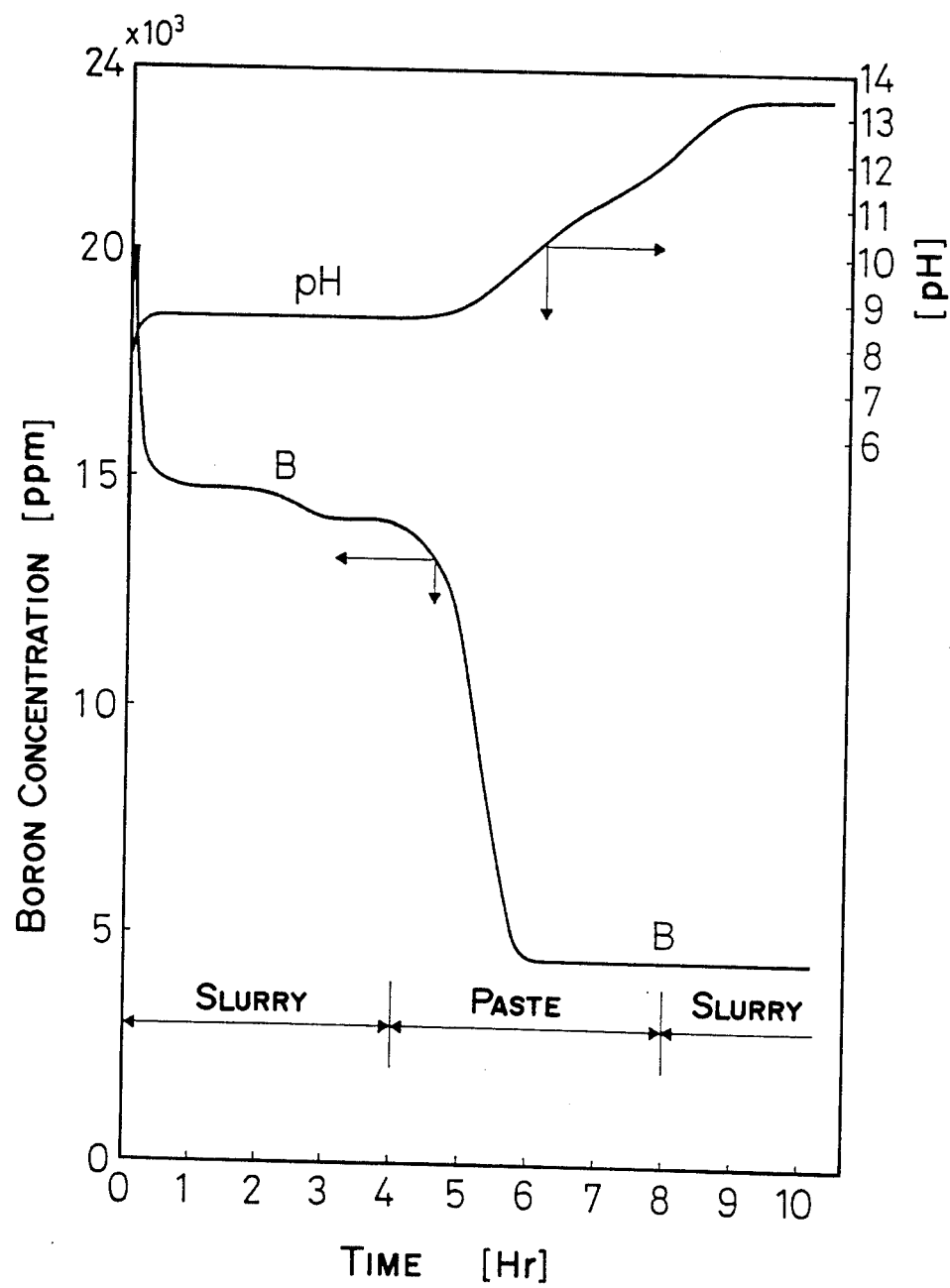
FIG. 5 is a graph showing changes over time in the boron concentration and pH during aging and precipitation of calcium borate in the liquid phase.

This change is shown in FIG. 5. The graph shows changes in the B content and the pH of the liquid over time. When calcium hydroxide is added, at a Ca/B ratio of 0.3, to concentrated waste water containing boric acid in a boron content of 21,000 ppm and caustic soda in a Na/B ratio of 0.26 at a pH of 7.5, the liquid is stirred at 70° C. to precipitate calcium borate, and one hour later after precipitating calcium borate the temperature is lowered to 50° C. while stirring is continued. A lowering of the B content accompanies formation of insoluble salts. The change of the liquid into a paste and the slightly delayed rise in pH can be seen.

Figure 6:
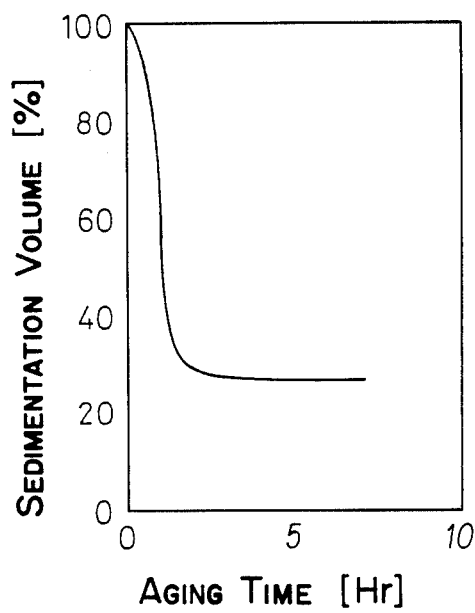
FIG. 6 is a graph showing the decrease in the sedimentation volume of insoluble calcium borate during aging.

Aging is carried out at a lower temperature than was used for precipitation, and one to several hours are required. Preferable, aging is carried out for a minimum of two hours. FIG. 6 charts the progress of aging after the first six hours of the test in FIG. 5 and shows the decrease in sedimentation volume when the liquid was allowed to stand and not disturbed. The graph shows the favorable growth of crystals and that aging can be completed in a shortened period of time.

Concerning the amount of calcium compound to be added, from the point of view of the Na content the smallest necessary amount, shown as the Ca/B ratio, depends on the Na/B ratio.

Figure 7:
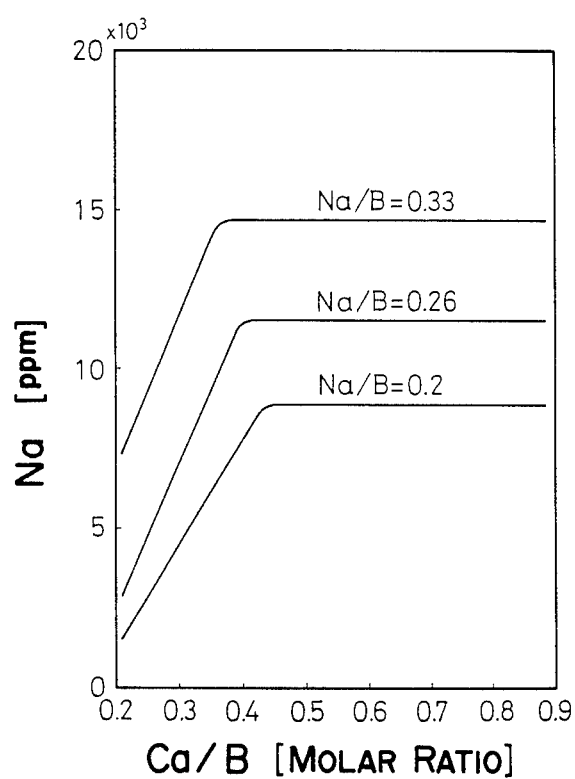
FIG. 7 is a graph showing the rise toward saturation in Na concentrations in the liquid phase of wastes after aging as increase of Ca/B ratiom, at various initial Na/B values.

These relationships are shown in FIG. 7. The graph shows various Na/B concentrations of the liquid with a 21,000 ppm boron content, and rise to saturation in Na content of the aged liquid as increase of Ca/B ratio. A Ca/B ratio of at least 0.3 is advisable.

It is desirable that the pH of the aged liquid be at least 12 so that it can be used to adjust the pH of the waste water.

On the other hand, if the calcium content of the supernatant becomes quite high, a problem of scale formation may occur during evaporation and concentration of waste water to which the supernatant has been added. In fact, however, when the Ca/B ratio is 0.35 (B content of 21,000 ppm), calcium in the liquid is less than 10 ppm, and was confirmed to present no special obstacle. Even if the Ca/B ratio becomes somewhat large there is no particular problem.

For this reason, during practical operation, such matters as waste water boric acid content, pH, amount of caustic soda to be added, degree of evaporation and concentration, and formation and aging of insoluble salts should be considered and a suitable Ca/B level selected.

The aged liquid is sent to an apparatus which separates it into a concentrated solid slurry and a supernatant. As shown in FIG. 6, the liquid separates well with aging and poses no trouble in the operation. Separation equipment, such as commonly used filters or centrifugal separators, are chosen based on the percentage ofw ater content in the slurry. A low percentage of water content is preferred, in order to raise the volume reduction ratio, but from the view point of transport to the following solidification step and degree of difficulty in handling, the optimum waste content is established. Generally, a solid concentration of 30–80% by weight is suitable.

The cement solidification step, namely, mixing cement and water with the aforementioned concentrated solid and pourint it into a storage container, can be carried out by known methods.

Supernatant containing regenerated caustic soda is used to adjust the pH of the waste water, making up the loss of caustic soda, as necessary. To avoid trouble during evaporation and concentration there should preferably be no fine, suspended particles in the supernatant. A majority of these fine particles in the waste water coprecipitate with calcium borate and are removed with the separation equipment, but a portion remains and so, passage through equipment which filters it more finely is advisable.

For this purpose, it is preferable to use a filter of the hollow-fiber type which prevents passage of, for example, 0.04 μm or larger particles, and can be used repeatedly by air cleaning. Used in this way the equipment can be compact, and no secondary waste matter is generated. The concentrated water resulted from the air cleaning of the filter may be sent to the equipment used for insoluble salt precipitation and treated.

When reusing the supernatant, accumulation of radioactive nuclides must be taken into consideration. The major portion of radioactive nuclides in the waste water containing boric acid precipitate in the alkaline water, such as oxides or hydroxides, but dissolued nuclides, such as $Cs^{137}$, are also present and are selectively adsorbed and removed with zeolite.

If, for some reason, other unpreferable substances such as chlorine or chloride salts have accumulated in the supernatant, a reverse osmosis membrane can be used. The liquid which passes through the membrane is reused and the concentrated liquid is solidified.

According to the process of the second pattern, in the treatment of radioactive waste water containing boric acid, the large amount of caustic soda which is used to neutralize waste water and causes an increase in the amount of waste matter can be reduced by approximately one fourth. The decrease of the amount of caustic soda also effects preferably on the properties of solidifed product with cement.

When the radioactive waste water is to be solidified, as high a degree of volume reduction as possible is required, so it is most desirable to evaporate and dry the waste water. Pattern three of the present invention meets this demand.

This objective can be carried out in one operation using a thin film evaporator.

It was confirmed that the aforementioned aged slurry containing insoluble salts can be treated smoothly by feeding it to a thin film evaporator to carry out drying.

Figure 8:
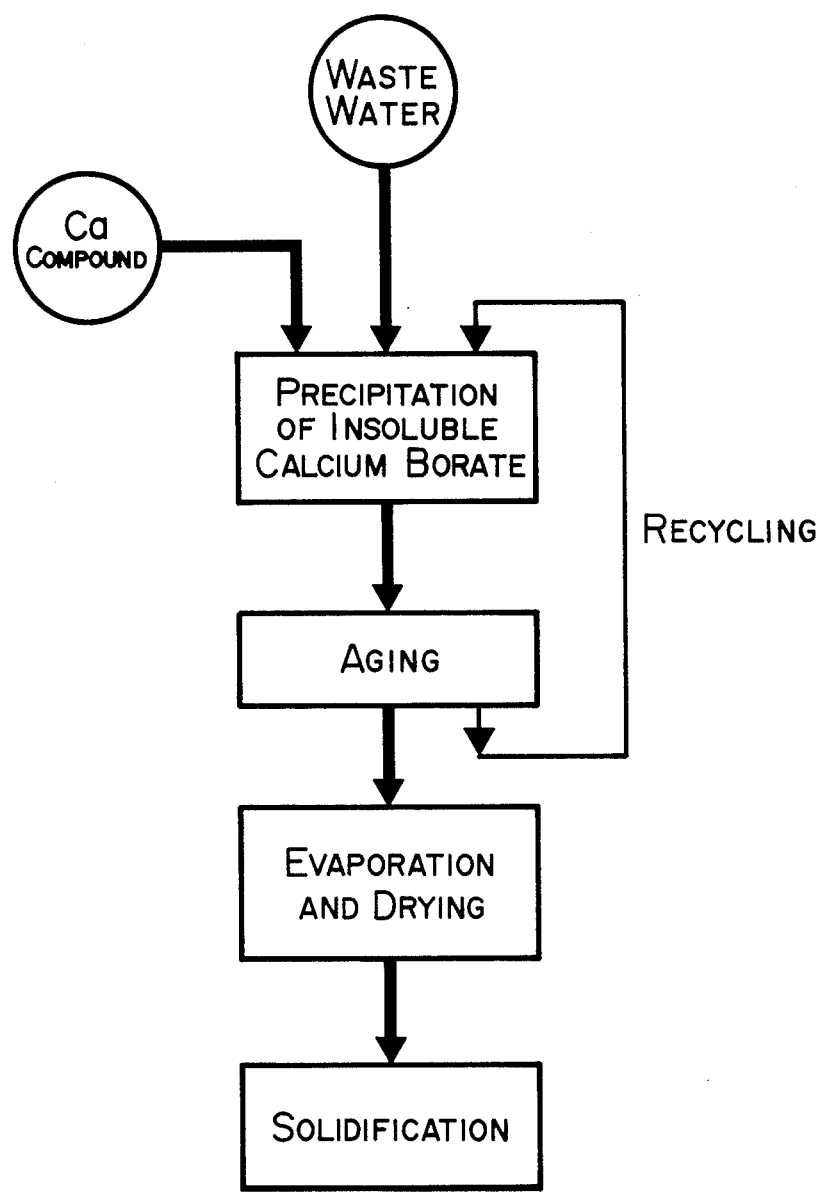
FIG. 8 is a block diagram showing the third pattern of the treatment method according to the present invention.

Pattern three of the present invention, a volumereducing solidification treatment of radioactive waste water containing boron and sodium, as shown in FIG. 8, is characterized by adding a soluble calcium compound to the waste water at a Ca/B molar ratio of 0.2–0.7, keeping a temperature from 40°–70° C. to from insoluble calcium salts containing boron, aging at a temperature lower than that used for forming of insoluble salts, to obtain a slurry, which is dired to a powder and solidifed with cement.

For evaporation and concentration, optional evaporation/drying equipment can be used to efficiently obtain a dried powder, and dryer equiped with a mechanical scraper is preferable. Using a thin film evaporator the solid component, including the radioactive substance of the waste water is dried to a powder of 0.1% or less water content, realizing the extremely hihg volume-reduction. As shown in the following example, the formation fo scales adhering to the heating wall is minimized, and the slurry can be easily dried.

During this operation, addition of a small amount of polyhydroxyl alcohol along with the waste water when it is supplied to the thin film evaporator is recommended. The addition of polyhydroxyl alcohol prevents the formation of hard scales when the radioactive waste water is dried in a thin film evaporator, as discovered by us and disclosed in Japanese Patent Disclosure No. 56-13995. It was confirmed that the above merit can be obtained in the concentration and evaporation, and drying, of a slurry obtained through formation of insoluble calcium salts and aging, according to the present invention.

As polyhydroxyl alcohols, any alcohols which are water-soluble and in a liquid state at room temperature, such as ethylene glycol, diethylene glycol, and glycerin can be used. The amount of polyhydroxyl alcohol to use is 1% os less of the solid component in the waste water, by weight, and generally 0.5% is sufficient.

The dried powder is mixed with cement and water and solidified. Condensate from the evaporator is recycled in various nuclear facility processes.

During the treatment according to the present invention, no adhesive matter is produced by the boron because asodium borate in the waste water is converted to insoluble borate, and since a slurry that is easy to handle is obtained, drying can easily be carried out. When the thin film evaporator is operating, problems present in the past, such as noise, vibration, increase in water content of the powder, decrease in heat transfer, and overload stoppage can be avoided, and stable operation over a long period is possible. A high degree of volume reduction is possible due to almost complete evaporation and separation of the water portion of the waste water. Also, cement hydration reaction to harden is not hindered. In an alternative of pattern three a portion of the aged liquid is recycled to a step in which insoluble salts are precipitated.

This preferred embodiment of pattern three, as shown in FIG. 8 with a thin line, involves a volume-reducing solidification treatment of radioactive waste water containing boron and sodium, and is characterized by adding a soluble calcium compound to the waste water, resulting in a Ca/B molar ratio of 0.2–0.7, keeping a temperature from 40°–70° C. to from insoluble calcium salts containing boron, aging at a temperature lower than that used for forming the insoluble salts to obtain a slurry, a portion of which is recycled back into the waste water, while the remainder is dired and solidified with cement.

With this method, the time required for a precipitation reaction to form insoluble salts is greatly reduced, to half the time or more needed when recycling is not carried out. This merit is attributable to the seeding effect produced by the added grown crystals.

According to the preferred embodiment of pattern three of the present invention, in addition to the results obtained in the aforementioned basic embodiment, the drying apparatus such as a thin film evaporator operates more stably and smoothly.

During the treatment according to pattern one, as shown in FIG. 1, the concentrated liquid becomes a paste, and the heat transfer coefficient of the evaporator concentrator gradually becomes smaller. To increase heat transfer, concentrated liquid paste can be scraped from the heating surface. However, equipemnt such as this has a complex structure, and is not only costly but from a maintenance viewpoint is a drawback.

In pattern four of the present invention, which is proposed as one of the solutions of this problem, solid-liquid separation is carried out prior to evaporation and concentration, and only the supernatant is evaporated and concentrated so that the amount of solid component in the evaporator and concentrator is remarkably lowered.

Figure 10:
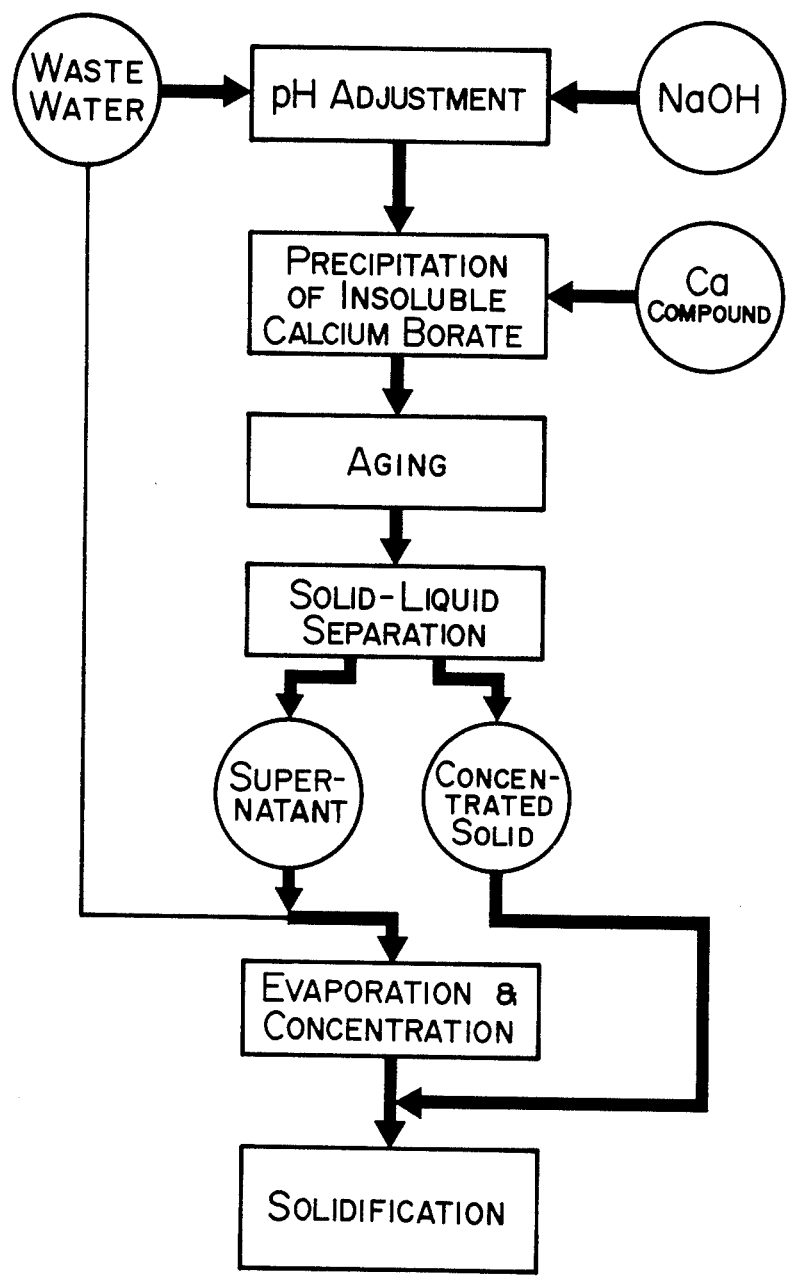
FIG. 10 is a block diagram showing the fourth pattern of the treatment method according to the present invention.

Pattern four, as shown in FIG. 10, is characterized by pH adjustment to alkaline or neutral by adding alkali, addition of a soluble calcium compound resulting in a Ca/B molar ratio of at least 0.2, stirring while keeping a 40°–70° C. temperature to form insoluble calcium salts containing boron, aging at a temperature lower than that used for forming of insoluble salts, to obtain a slurry, separating the liquid into supernatant and concentrated solid portions, evaporating and concentrating the supernatant, and solidifying the concentrated liquid and concentrated solid component with cement. Steps from pH adjustment of waste water to aging can be carried out as mentioned in the previous method.

The aforementioned slurry is easily handled and solid-liquid separation is easily carried out. For solid-liquid separation various filtration machines, centrifugal separators, and other optional equipment can be used. It is not necessary to lower the water content of the solid component extremely, and also there is no problem even if the supernatant contains a small amount of suspended solid. Even a decanter, which separates the slurry into thick slurry and supernatant is available.

The volume of the supernatant is reduced through evaporation concentration. Various equipment can be used to implement this step, and both the continuous and the batch method can be practiced. Among others, it is convenient to use a system of continuous supply of superntant, and batchwise discharge of concentrated liquid, or the forced circulation type semi-batch evaporator. Control of the degree of concentration is carried out by determining the amount of condensate obtained through evaporation.

The degree of concentration is based on the desired volume reductivity, workability of the concentrated paste, and the mixability in the following cement solidification step and the properties of the solidified product. In order to reduce the volume of hardened product to less than ½ of the volume of the original waste water, and to obtain satisfactory hardened product, the concentration of the solid component in the paste, which is a mixture of the concentrated solid obtained through the solid-liquid separation in and the evaporated and concentrated liquid obtained through the evaporation of 30–80% by weight, is suitable.

Cement solidification, or mixing the above described paste and cement (if necessary, with supplementary water) and pouring into a container, can be carried out by known methods.

A modification of pattern four involves the addition of a portion of the waste water to the supernatant which is evaporated and concentrated. The preferred embodiment of pattern four, as shown in FIG. 10 with a thin line, involves a volume-reducing solidification treatment of radioactive waste water containing boron, and is characterized by adding alkali to one portion of the waste water for alkaline pH adjustment to alkaline or neutral, adding a soluble calcium compound resulting in a Ca/B molar ratio of at least 0.2, stirring while keeping at 40°–70° C. temperature to form insoluble calcium salts containing boron, aging at a temperature lower than that used for forming of insoluble salts to obtain a slurry, separating the liquid into supernatant and concentrated solid portions, adding the remainder of the waste water to the supernatant, which is then evaporated and concentrated, and solidfying the concentrated liquid and concentrated solid with cement.

The modified embodiment aims at an especially high volume reduction. The supernatant obtained through solid-liquid separation is strongly alkaline with a pH of 12 or more and has an Na/B ratio greater than 1 when caustic soda is used for pH adjustment of the waste water. When this supernatant, with a concentration degree of more than 10, is mixed in cement along with the concentrated solid component, soluble salts in the concentrated liquid precipitate. Because the precipitated salts are metaboric acid salts with an Na/B of 1, Na/B value in the liquid becomes large again. In such a case, the hydration of the cement in the early stages is acceleerated and setting time is shortened. Since this causes a reduction in the handling time of the cement paste during solidification step, it is disadvantageous for pouring the paste into a container.

Because the Na/B ratio in the waste water is normally 0.2–0.3, the Na/B in the supernatant can be reduced by adding waste water to the supernatant and a reduction in the setting time of the cement paste can be avoided. The amount of waste water added to the supernatant is selected so that an Na/B ratio in the supernatant may be 3 or less before evaporation and concentration. Excessive addition lessens the effectiveness of the insoluble calcium borate precipitation, which is the aim of the present invention.

According to pattern four of the present invention, the paste formed during precipitation of insoluble borates is changed into a slurry, substantially all of the borates are converted to insoluble salts, there is no adverse effect on cement condensation and mixing, and a favorable solidified product can be obtained as achieved in the above-described patterns and alternatives thereof.

Problems during the evaporation and concentration step are solved, due to adoption of solid-liquid separation step, and special equipment is not necessary, so that evaporation concentration can be carried out efficiently using conventional equipment.

Further, according to the modified embodiment in which a portion of the waste water is added to the supernatant, the solidification step can also be carried out effectively.

EXAMPLE 1

A simulated waste water containing boron was prepared by adding caustic soda to a boric acid ($H_3BO_3$) aqueous solution, yeidling a B concentration of 2.1% by weight and an NA concentration of 1.2% by weight. The pH of the simulated waste (hereinafter referred to in examples 1–10 as waste water), at 20° C., was 7.5.

Calcium hydroxide powder was added at a Ca/B molar ratio of 0.33, and the temperature of the water was kept at 60° C. while being stirred.

As soon as the water had changed into a paste, the produced matter was observed under a microscope and had a needle- or fibrous shape forming agglomerates.

The water was then cooled to 40° C. and aged while keeping this temperature, and changed into a slurry.

The precipitated matter showed a satisfactory property and the sedimented volume was small. Microscopic observation showed not the previouslymentioned needle or fibrous shape but an almost complete change into large platy or prismatic-shaped crystals.

B concentration in the liquid phase was 0.3%. The solid component concentration was 15% (on the basis of drying at 70° C.) and the slurry was easily handled and conveyed.

This slurry was heated to 100° C., under atmospheric pressure, causing evaporation of the liquid portion, and the solid component was concentrated to the 60% level. The evaporation and concentration equipment used had a rotating body inside and the heating medium was circulated in the inner rotating body and the outer wall. Slurry was continuously fed into this equipment at a constant rate.

Solid component concentration in the paste formed by the evaporation and concentration was calculated on the basis of the amount of condensed water.

Fifty parts (by weight) of portland cement was added to one hundred parts (by weight) of the concentrated paste, and mixed for ten minutes. Mixing was easily carried out and produced a high consistency mortar.

This mortar was poured into a storage container and cured for one day to harden. The specific gravity of the hardened product was 1.8.

A portion of the same mortar was also poured into molds, and specimens were for strength testing. The compressive strength of the hardened product was 230 kg/cm2 at 28 days curing.

For comparison, stirring of the previouslymentioned paste, before aging, was continued while holding the paste at 70° C., but its external appearance and the shape of produced matter did not change, and the separability of the liuqid was not improved. Mixing with portland cement was carried out but found to be difficult due to low consistency of mixture, and a satisfactory hardened product was not obtained.

EXAMPLE 2

Lime slurry at a Ca/B molar ratio of 0.2 was added to the same waste water as used in Example 1. The lime slurry was prepared by calcining calcium carbonate at 1,500° C. and slaking the thus obtained calcium oxide to give a solid concentration of 30% (by weight).

The waste water with added lime slurry was stirred while holding the temperature at 60° C.. After the liquid had changed into a paste it was cooled to 30° C., aged at that temperature, and a liquid slurry was obtained. The precipitate easily sedimented.

This slurry was concentrated as in Example 1 and a paste with a 50% solid component concentration was obtained.

One hundred parts (by weight) of the concentrated paste were poured in a cylindrical container, and seventy parts of type-C blast furnace slag cement were added thereto, and were mixed using a stirrer for 5 minutes. Then, the mixture was vibrated for 3 minutes on a table vibrator.

The mixture was cured for one day at room temperature and hardened into block form. Its specific gravity was 1.7. Specimens were prepared for strength testing, as in Example 1, and after 28 days curing a compressive strength value of 200 kg/cm2 was obtained.

EXAMPLE 3

Calcium hydroxide, at a Ca/B molar ratio of 0.5, was added to the same waste water as used in Example 1. Then, the waste water was stirred at 40° C. until boric acid concentration reached 0.4%.

The water was cooled to and held at 30° C. while he water changed from a paste to a slurry, and an easily sendimenting precipitate was obtained.

This slurry was concentrated as in Example 1 and a paste with a 63% solid component concentration was obtained.

The concentrated paste was discharged into a jacketed mixer and cooled to 40° C.

Fifty seven parts of portland cement were added to one hundred parts of the concentrated paste and mixed. The high consistency mortar obtained was easily poured into a storage container.

The mortar was cured at room temperature to harden, and after 28 days, a compressive strength value of 260 kg/cm2 was reached.

EXAMPLE 4

As in Example 1, a slurry was obtained after aging a portion of waste water to which calcium hydroxide had been added. This slurry, and calcium hydroxide at a Ca/B molar ratio of 0.5, were added to the remaining waste water, and insoluble salts were precipitated out while stirring at 60° C. The liquid was cooled to 40° C. and aged. The amount of the slurry added to the waste water or the recycling percentage was varied to determine the time necessary for precipitating the insoluble salts.

Figure 3:
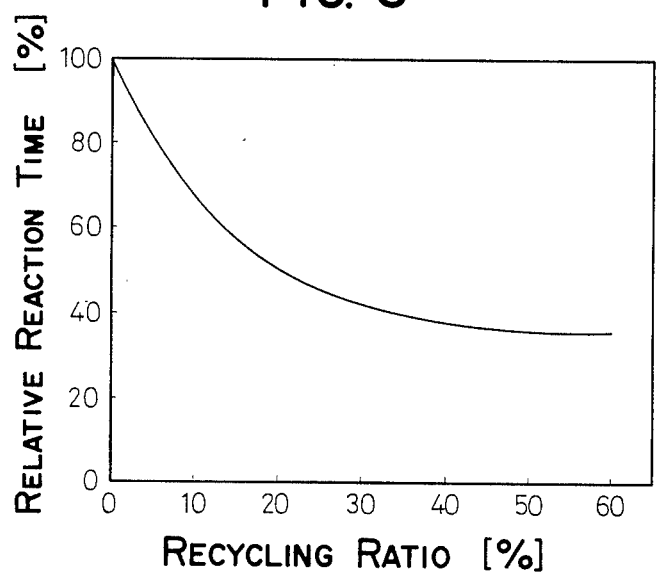
FIG. 3 is a graph showing the relationship between the reaction time required and the recycling ratio of the water after aging in a preferred embodiment of the first pattern of the treatment method according to the present invention.

The results are shown in FIG. 3. By increasing the recycling ratio, reaction time required could be decreased as much as 35% as compared with a case when no recycling was carried out.

The aged waste water was a slurry with a high sedimenting property, and suitable for evaporation and concentration. The concentrated paste, when solidified with cement, gave the same favorable results as in Examples 1-3.

EXAMPLE 5

As in Example 4 an aged water containing a precipitate was prepared, and added to the waste water at a recycling ratio of 28%, and, calcium hydroxide at a Ca/B molar ratio of 0.5 was added, the water stirred at 40° C., producing insoluble salts, and aged at 30° C. Time needed for a reaction to obtain the precipitate was 41% of the time required when no recycling took place.

The aged water evaporated and concentrated, and solid component concentration was raised to 60%. Fifty parts of portland cement were added to 100 parts concentrated paste and mixed. A hardened product was obtained at ambient temperature. Compressive strength after 28 days was 220 kg/cm2 and specific gravity of the product was 1.8.

EXAMPLE 6

Ten cubic meters of waste water containing boric acid ($H_3BO_3$) ith 2,100 ppm as boron was prepared, and evaporated while caustic soda was added, to reduce its volume 90%. Boron concentration became 21,000 ppm, or 2.1%. At 25° C. the pH was 7.5. Caustic soda was added so as to amek an Na/B ratio of 0.26.

The concentrated liquid was put in a reaction vessel with up/down and rotary mechanisms to uniformly stir the contents. While stirring the liquid at 70° C., calcium hydroxide was added at a Ca/B ratio of 0.33, causing a reaction to occur forming calcium borate.

After one hour, heating was stopped, and the liquid was cooled to approximately 40° C. while stirring was continued, and then aged.

Na concentration in the liquid when the pH searched at constant value was approximately 13,000 ppm or 1.3%.

This liquid containing calcium borate was treated in a vertical centrifuge and concentrated. Six hundred kg of suppernatant and 170 kg of solid component concentrated liquid were obtained.

The separated supernatant containing 2.3% by weight of NaOH, was replenished with 1.6 kg of NaOH and was used to adjust the pH of the following 10m$^3$ of waste water.

One hundred kg of portland cement was added to the solid component concentrated liquid, mixed, and poured into a drum container. Volume of the mixture was 160 liters. The container was sealed tight and after curing for 28 days at 20° C.±2° C., the density of hardened blends was 1.71 g/cm$^3$. In another tests for compressive strength according to JIS standards, 230 kg/cm$^2$ after 28 days, curing, and 260 kg/cm$^2$ after 3 months were obtained. Also, hardened block cured for 23 days was immersed in water for 3 months. It showed no change in its external appearance, change in weight was less than 0.1%, and it had a compressive strength of 255 kg/cm$^2$.

EXAMPLE 7 AND CONTROL SAMPLE

A waste water containing boron and sodium was prepared by dissolving boric acid (H$_3$BO$_3$) and sodium hydroxide (NaOH) in water, yielding a B concentration of 2.1% (by weight) and an Na concentration of 1.2% (by weight). The pH of the waste water, at 20° C., was 7.5.

Calcium hydroxide powder was added at a Ca/B molar ratio of 0.33, the liquid was stirred while kept at 70° C., and insoluble salts were formed. The liquid was cooled to 40° C., aged and a slurry was obtained.

The slurry was evaporated in a vertical thin film evaporator at a flow rate of 30 liters/hour and dried into a powder. The thin film evaporator was heated by steam of 170°–175° C. from its outer jacket having a heat transfer area of 0.5 m$^2$. Even more than 8 hours of continuous operation exhibited no increased driving power of the machine and drying into a powder was possible with no problems. Water content of the dried powder was 0.1%.

For comparison, waste water was evaporated in the same evaporator. As the operation proceeded, driving power of the machine increased, there were formed hard coarse particles in the dried powder, and water content of powder gradually increased. After one hour clogging of the conveyor and the hopper in the bottom of the evaporator dried to powder occurred, and after 3.6 hours the evaporator had to be stopped.

Figure 9:
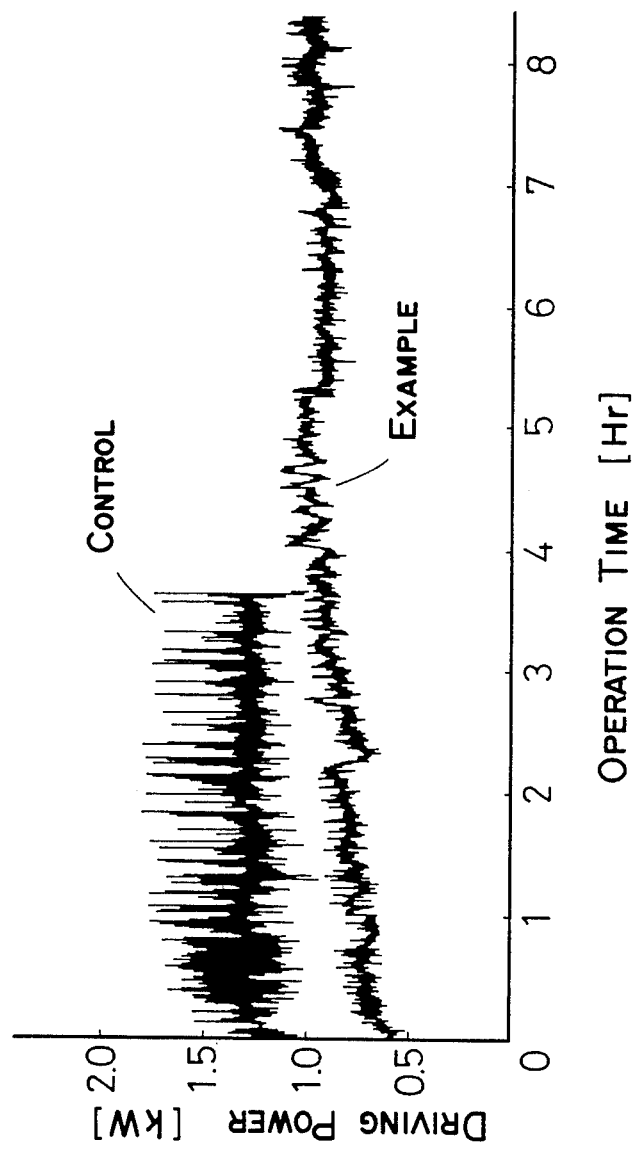
FIG. 9 is a graph showing changes over time in the power required by a thin film evaporator used in the third pattern of the present invention, along with the results of a control example of the prior art.

In the above two cases, changes of driving power of the evaporation over time are shown in FIG. 9. With the method according to the present invention, driving power of the equipment was low and stable, and even with a long operating time there was little change. With the prior art, from the beginning driving power was not only high but changed widely and was unstable. The equipment also generated much noise.

EXAMPLE 8

Example 7 was repeated, but in this case when slurry was fed to the thin film evaporator, 0.5 parts by weight of diethylene glycol were added to 100 parts by weight of slurry.

The equipment generated practically no vibration or noise, and extremely stable operation was possible for a long period. Water content of the dried powder was less than 0.1%.

During operation of the evaporator the driving power required for the evaporator is compared with Example 7 to reveal that the driving power of the equipment was nearly the same, but there was less change, and the addition of polyhydroxyl alcohol was regarded as effective.

EXAMPLE 9

A waste water containing boron was prepared by adding caustic soda to a boric acid (H$_3$BO$_3$) aqueous solution, yielding a B concentration of 2.1% by weight and an Na concentration of 1.2% by weight. The pH of the waste water was 7.5 at 20° C.

Calcium hydroxide powder was added at a Ca/B molar ratio of 0.33, and the temperature of the liquid was kept at 60° C. while being stirred.

The liquid was then cooled to 40° C. and aged while maintaining this temperature, yielding a slurry. B concentration of the liquid was 0.3%, and with a solid component concentration of 15% (when dried at 70° C.), was a slurry easy to handle and convey.

Using a centrifuge, a concentrated solid component (70% solid composition) and a separated supernatant were obtained from the slurry.

The separated supernatant was heated to 100° C., under atmospheric pressure, and was evaporated and concentrated to 60% of solid component. A semi-batch type, forced-circulation evaporator was used and the separated supernatant was continuously fed to at a constant rate.

Fifty parts by weight of portland cement were added to one hundred parts by weight of a combination of this concentrated liquid and the above-mentioned concentrated solid component, and mixed for ten minutes. The mixed mortar was poured into a storage container and it hardened after one day. The specific gravity of the hardened block was 1.8. The compressive strength of hardened block was 230 kg/cm$^2$ at 28 days.

EXAMPLE 10

Lime slurry at a Ca/B molar ratio of 0.7 was added to 90% of the volume of the same type of waste water as used in Example 9.

The waste water with added lime slurry was stirred while holding the temperature at 60° C. After the liquid had changed to a paste it was cooled at 30° C., aged at that temperature, and a liquid slurry was obtained.

As in Example 9 the solid and liquid components were separated, resulting in a solid component concentration of 70%.

The pH of the separted liquid was approximately 12 and the Na/B molar ratio was roughly 3.6. When the remaining 10% of the waste water was added to the separated liquid the Na/B molar ratio was lowered to roughly 1.6. The mixture was evaporated using the same equipment as in Example 9, and was concentrated to the 60% of the solid component. Seventy parts of type-C blast furnace slag cement was added to 100 parts of the mixture of this concentrated liquid and the previously-mentioned solid component, those were put into a cylindrical container and mixed for 5 minutes using stirrer. The mixture was then vibrated for 3 minutes on a table vibrator.

The container was left for one day at room temperature and the mixed mortor hardened into block form. Its specific gravity was 1.7. A sample was prepared for compression testing and after 28 days a value of 200 kg/cm$^2$ was obtained.

We claim:

1. A method of volume-reducing solidification treatment of radioactive waste water containing boron, consisting essentially of: adjusting the pH of a boron containing waste water to between 7.0 and 8.0 with caustic soda; adding a soluble calcium compound in an amount sufficient to obtain a Ca/B molar ratio of at least 0.2; stirring the liquid while maintaining the liquid at a temperature between 40° and 70° C. to form insoluble calcium salts containing boron; aging the thus obtained mixture with stirring for at least one hour at a temperature below that used for forming insoluble salts to obtain a slurry; evaporating and concentrating at least a portion of said slurry; and solidifying the concentrated liquid by mixing with cement and drying.

2. A method according to claim 1, which further comprises a step wherein a portion of the aged liquid containing the insoluble salts containing boron is recycled and added to said boron containing waste water.

3. A method according to claim 1 or claim 2, wherein said soluble calcium compound is selected from the group consisting of calcium hydroxide and calcium oxide, and wherein a portion of the aged liquid is added to the waste water for pH adjustment.

4. A method according to claim 2 wherein the percentage of aged liquid recycled into the waste water is from 10–30%.

5. A method according to one of claims 1, wherein the solid component concentration of the slurry obtained through evaporation and concentration is from 30–80% by weight.

6. A method of treating radioactive waste water containing boric acid consisting essentially of: adding caustic soda to a boric acid containing waste water until the pH is between 7.0 and 8.0; evaporating and concentrating the resultant mixture; adding a soluble calcium compound to the concentrated liquid in an amount sufficient to precipitate calcium borate salts; aging the mixture until the pH has risen to at least about 12; separating the aged mixture into supernatant and precipitate portions; solidifying the precipitate portion; and returning at least a portion of said supernatant portion to said untreated boric acid containing waste water to raise the pH to said waste water.

7. A method according to claim 6, wherein the caustic soda and soluble calcium compound added to the boric acid containing waste water are in amounts sufficient to obtain a Na/B ratio of at least 0.2, and a Ca/B ratio of at least 0.3.

8. A method according to claim 6, wherein precipitation of insoluble calcium borate is carried out while stirring at a temperature from 40°–70° C., and in which aging is carried out at a lower temperature than that used for precipitation.

9. A method according to claim 6, wherein fine particles suspended in the supernatant portion which has been separated from the aged mixture are removed by filtration prior to returning said supernatant portion to said untreated boric acid containing waste water.

10. A method according to claim 9, wherein the filtered supernatant portion is brought into contact with a zeolite to selectively remove radioactive nuclides prior to returning said supernatant portion to said untreated boric acid containing waste water.

11. A method according to claim 9 wherein the filtered supernatant portion is treated by reverse osmosis to separate the supernatant portion into a permeate fraction and a concentrated fraction, said permeate fraction being recycled.

12. A method of volume-reducing solidification treatment of radioactive waste water containing boron, consisting essentially of: adjusting the pH of at least a portion of a boron containing waste water to between 7.0 and 8.0 by the addition of caustic soda; adding a soluble calcium compound in an amount sufficient to obtain a Ca/B molar ratio of at least 0.2; stirring the resulting mixture while maintaining a temperature between 40° and 70° C. to form insoluble calcium salts containing boron; aging said mixture for at least one hour at a temperature below that used for forming insoluble salts to obtain a slurry while stirring; separating the slurry into supernatant and concentrated solid portions; evaporating and concentrating the supernatant; and solidifying the concentrated liquid and concentrated solid with cement.

13. A method according to claim 12 wherein a portion of the boron containing waste water is mixed, without prior treatment, with the supernatant portion obtained after separation of the aged slurry.

14. A method according to claim 12 wherein the concentration of solids obtained after recombination of evaporated supernatant and separated solid portion is between 30 and 80% by weight.

15. A method according to claim 13, wherein caustic soda is used as the alkali, and the amount of boron containing waste water added to the separated supernatant is in an amount sufficient to obtain a Na/B molar ratio in the combined liquid of not more than 3.

* * * * *